United States Patent [19]

Ferguson

[11] Patent Number: 5,692,597
[45] Date of Patent: Dec. 2, 1997

[54] CONVEYOR BELT ASSEMBLY

[75] Inventor: Gregory A. Ferguson, New Bedford, Mass.

[73] Assignee: Precision Handling Devices, Inc., Fall River, Mass.

[21] Appl. No.: 440,581

[22] Filed: Jun. 28, 1995

[51] Int. Cl.⁶ ................................................ B65G 15/60
[52] U.S. Cl. ........................................ 198/841; 198/861.1
[58] Field of Search ................................ 198/841, 861.1

[56] References Cited

U.S. PATENT DOCUMENTS

| | | |
|---|---|---|
| 3,917,092 | 11/1975 | McGianis . |
| 4,037,714 | 7/1977 | Koepke . |
| 4,050,575 | 9/1977 | Rossid . |
| 4,142,625 | 3/1979 | Bourgeois . |
| 4,228,888 | 10/1980 | Bruno . |
| 4,346,803 | 8/1982 | Haessler . |
| 4,437,564 | 3/1984 | Redder . |
| 4,925,009 | 5/1990 | Hill ........................... 198/841 |
| 5,083,659 | 1/1992 | Bode . |
| 5,096,048 | 3/1992 | Lachner . |
| 5,188,219 | 2/1993 | Mitsumoto . |
| 5,217,103 | 6/1993 | Umlauf ........................ 198/841 |

Primary Examiner—Joseph E. Valenza
Attorney, Agent, or Firm—M. Lukacher

[57] ABSTRACT

A low cost, self contained endless conveyor belt assembly includes a flat conveyor bed, an endless conveyor belt and a plurality of frame members mounted thereto. The bed mounted frame members support and house a drive shaft which includes sprockets for engaging the front inside radius of the endless conveyor belt and a remote mounted drive motor. The self contained conveyor belt assembly is adjustably mounted to complemental frame rails, one of which includes the drive motor to which can be coupled the drive pulley of the endless conveyor belt.

19 Claims, 7 Drawing Sheets

CONVEYOR BELT ASSEMBLY

The present invention relates to conveyor belt assemblies, and, more particularly, to self-contained endless conveyor belt assemblies which can be readily integrated into support frames or rails which contain drives for powering and motorizing the conveyor belt assemblies, and in alignment with such drives to provide conveyor systems of various sizes as needed for different uses.

Typically, in previously known conveyor belt structures, a pair of massive and very rigid frame members were provided between which an equally massive and heavy support platform was mounted. The conveyor belt was designed to be engaged by a drive shaft journalled in bearings between the massive frame members which, in turn, was driven by a chain, or heavy drive belt, coupled to an electric motor. The motor was also mounted to the massive frame members. The underside of the conveyor belt was typically smooth and required tensioning of the belt between equally massive crowned drive pulleys. Since the entire system was massive and heavy, in order to achieve sufficient driving torque, a substantial amount of friction had to be maintained between the conveyor belt and the drive pulley. Thus, a rigid conveyor belt structure was needed.

In such prior systems, the opposed massive frame members had to be in nearly perfect alignment to each other (both along the X-axis—up and down, and the Y-axis—front to rear) in order to prevent premature wear, or worse, failure of the bearings in which the drive shaft was journalled. Obviously, any such misalignment results in poor performance and, potentially, expensive repairs to the conveyor belt structure. For example, if the frame members are misaligned to each other, as can occur in either of the cases described above, the drive shaft will also be misaligned or "cocked" between the frame members. Although the frame mounted bearings are still aligned, or parallel, to each other, unacceptable friction, wear and other undesirable characteristics can still be introduced therein because of the off-set of the frames. Early failure, oftentimes catastrophic, of such conveyor belt systems frequently occurred.

In certain environments, for example, where wash down of parts supported on the conveyor belt and, especially, in those areas where corrosive materials are used, plastic belting has been selected because of its inherent strength and resistance to such hostile environments. However, even though conveyors using such plastic belting are generally much less massive, very large and rigid support structures have been used for their support.

Examples of such massive, rigid conveyor belt systems are disclosed in U.S. Pat. Nos.; 3,917,092; 4,037,714, 4,050, 575; 4,142,625; 4,228,888; 4,346,803; 4,437,564; 5,083, 659; 5,096,048 and 5,188,219.

The general objects of the present invention therefore are to provide an improved, endless conveyor belt assembly, and especially which is self contained, except for a support for the assembly which motorizes the conveyor belt, and which may be constructed from low cost, easy to manufacture, light-weight materials (plastics), and which is easy to install and align with a support structure so as to integrate one or more of such conveyor belt assemblies into an integrated conveyor system.

Briefly, in accordance with one feature of the present invention, a self contained endless conveyor belt assembly is provided having a conveyor bed mounted to a plurality of frame members. A light-weight conveyor belt is disposed on the conveyor bed so as to pass over the bed and around the frame members. A drive shaft, journalled between the bed mounted frame members, carries a sprocket for engaging the conveyor belt and is attachable in aligned relationship with a drive motor. The motor may be in a support for the assembly, preferably rails between which the assembly is disposed and to which it is attached in aligned relationship. One or more such assemblies are mounted to the support to provide an integrated conveyor system.

The foregoing and other objects and advantages of the invention will become more apparent from a reading of the following description in connection with the accompanying drawings in which.

Figure 1:
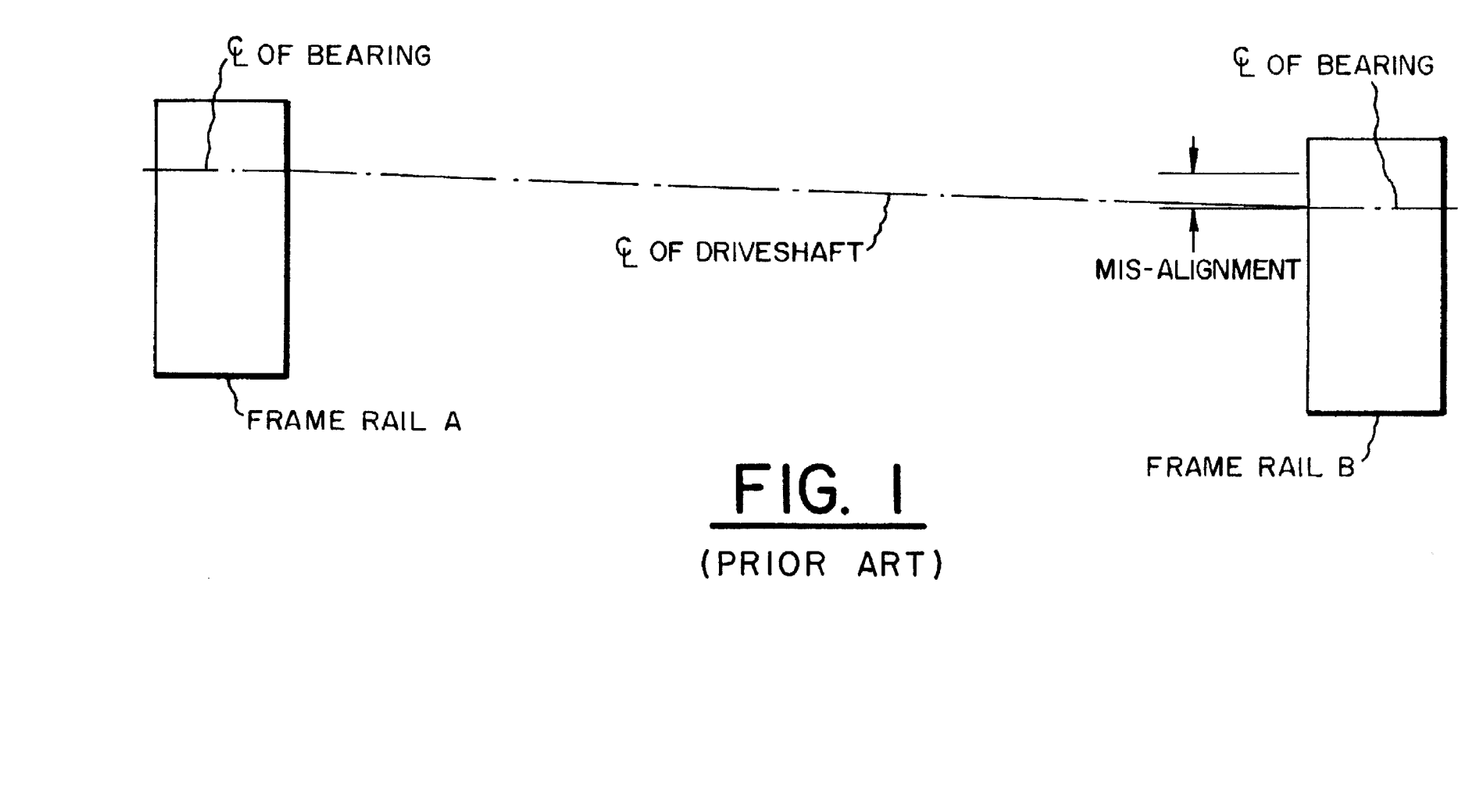
FIG. 1 is a schematic view of the prior art conveyors, which are discussed above, the view showing a misaligned support frame.

Refer now more particularly to FIG. 1, there is shown a prior art endless conveyor belt systems which suffers from misalignment which occurs between the side frame rails A & B. For example, although frame rails "A" and "B" as shown are parallel to each other, they are not in alignment with each other which results in the center lines of the bearings being misaligned with respect to each other. Consequently, any drive shaft journalled between those bearings will be "cocked" from one side to the other resulting in poor performance and, in many instances, early bearing failure. In order to overcome this situation, it has become standard procedure within the industry to construct the support frames, as well as the interconnected conveyor belt support bed from massive and very rigid structures to ensure that the entire unit was square and that all bearings and bearing surfaces were true to each other.

Prior art conveyors used flat belts with relatively smooth surfaces in contact with the drive pulleys. Massive crowned pulleys were used to drive the endless belt. A misaligned frame would result in poor tracking of the belt causing the edge of the belt to "rub" the supporting frames. This "rubbing" results in "drag" or an increased force to move the belt. Therefore, to assure that proper tracking of the belt as well as sufficient friction to move the belt resulted. The support structure had to resist bending or twisting forces applied by the belt driving system.

Beyond assuring that the endless conveyor belt assembly remained square, a massive structure was required in the prior art conveyors to prevent any "twist" or "rack" from occurring between the frame members resulting in the drive shaft binding, stalling or, in a worst-case scenarios, seizing in the bearings. Further, as most currently known conveyor belt systems utilize massive structures such as described above, it is mandatory that they employ an electric motor of fairly significant size in order to achieve the required torque to overcome the friction created between the belt and bed and the load being supported and transported on the belt. The low cost, self contained endless conveyor belt assembly in accordance with the invention substantially obviates the problems described above.

Figure 2:
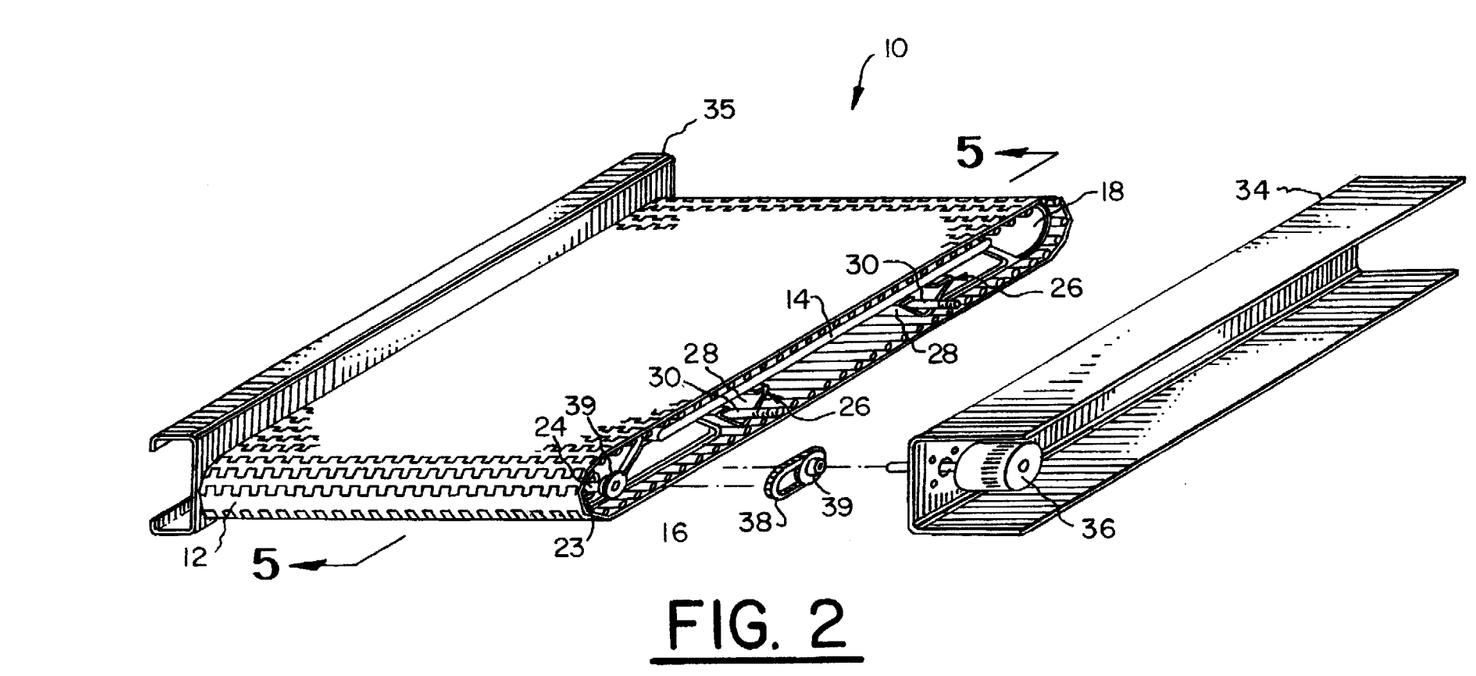
FIG. 2 is a partially exploded, perspective view showing the top front of a low cost, self-contained endless belt conveyor assembly according to the present invention and motorized side rails of a support for the assembly.
Figure 3:
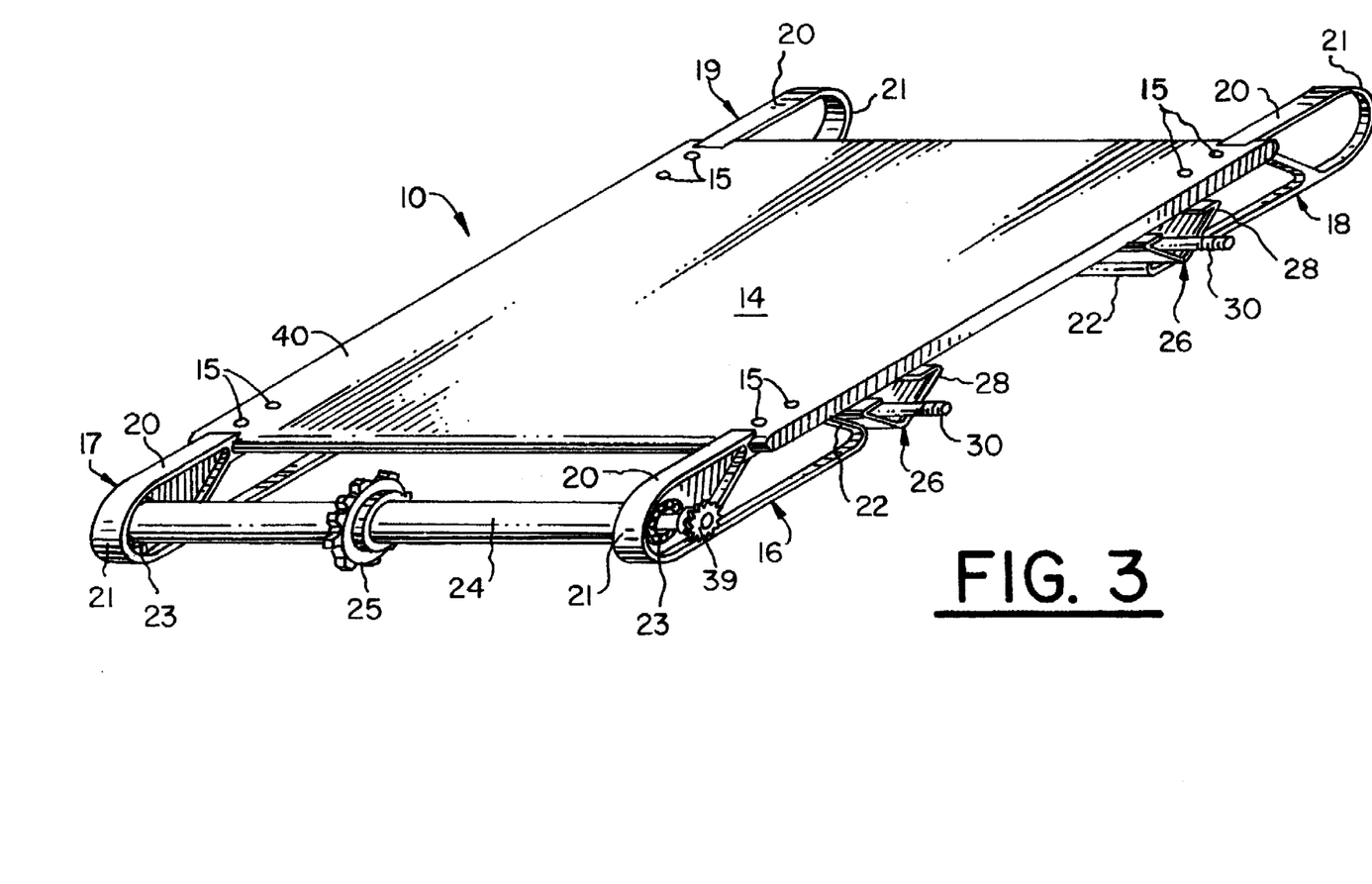
FIG. 3 is a perspective view of the assembly, shown in FIG. 2, without the conveyor belt, and without side rails of the support which carry a drive motor.
Figure 4:
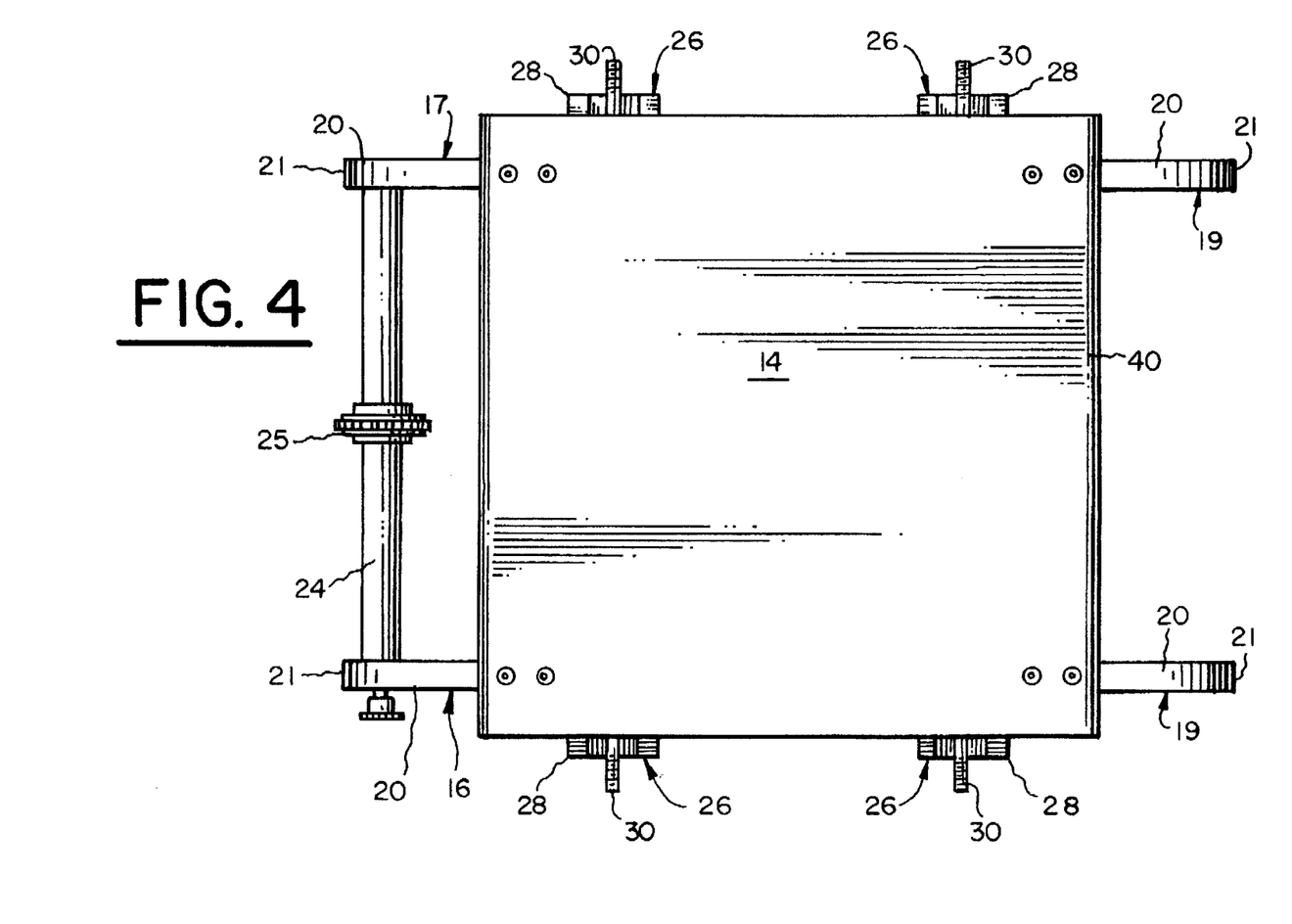
FIG. 4 is a top plan view of the assembly shown in FIG. 3.
Figure 5:
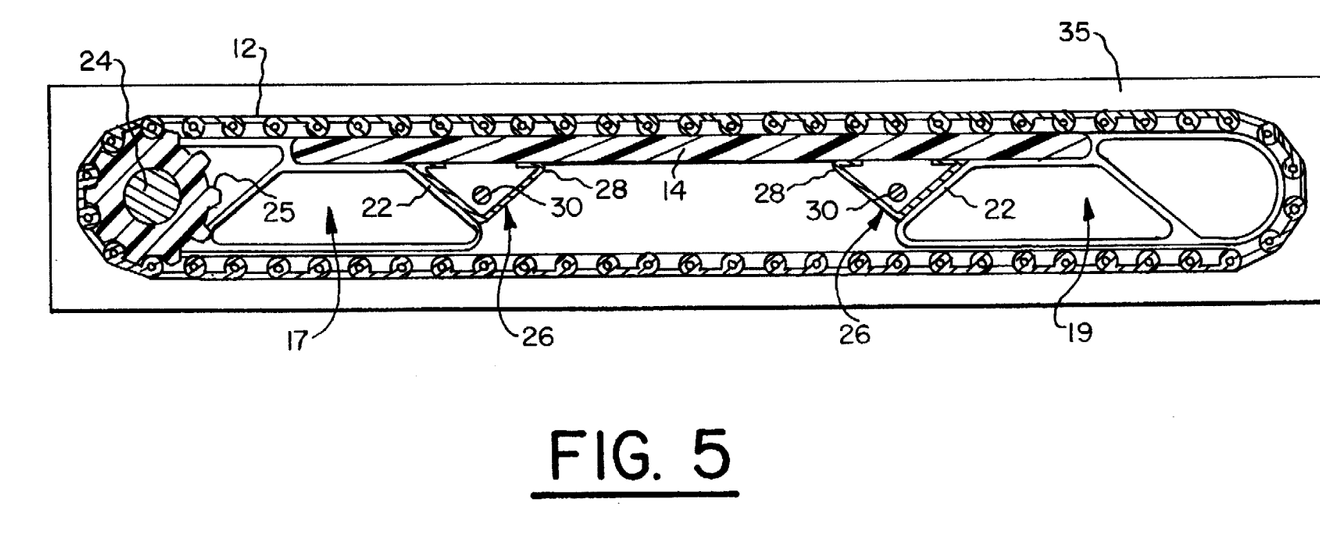
FIG. 5 is a cross-section view taken along line 5—5 in FIG. 2.

As illustrated in FIGS. 2–6, the endless conveyor belt assembly 10 of the present invention generally includes an endless conveyor belt 12 which is preferably constructed from a plastic material, such as polypropylene. Belt 12 is positioned on a flat conveyor bed 14 which is also may be constructed from a plastic material, such as polyethylene. A plurality of bed mounted frames 16, 17, 18 and 19 are generally mounted by way of screws 15 to the leading edge of conveyor bed 14, such as is illustrated in FIGS. 3 and 4. Each bed mounted frame 16–19 includes a flat upper surface 20, a rounded, or curved, portion 21 and a ramped section 22, as shown in FIGS. 3 and 5. Similar to the previously described conveyor belt 12 and bed 14, bed mounted frames 16–19 also may be constructed from a plastic material, such as, for example, polypropylene. The frames 16–19 and the bed may be an integral or unitary structure; for example, they may be molded from plastic as a monolithic part for use in the assembly 10.

As best seen in FIG. 2 and 3, the leading pair of bed mounted frames 16 and 17, include bearings 23 for supporting and journalling a drive shaft 24. The shaft carries a first sprocket or pulley 25 for engaging conveyor belt 12. A second sprocket 39 is also carried on and rotatable with the shaft 24. This sprocket engages, via belt 38, a drive motor 36 which is fixedly mounted to one 34 of a pair 34 and 35 of support frames or rails 29.

As best illustrated in FIGS. 2–5, a pair of spanner assemblies 26, comprising elongate V-shaped members 28 and threaded shafts 30 are positioned beneath the conveyor bed 14. V-shaped members 28 are configured such that the upper portions thereof contact and support the undersurface of bed 14. Further, it will be seen that one leg of each V-shaped member 28 mates against the ramped portion 22 of bed mounted frames 16–19, and may be attached thereto and/or also to the bed 14. End threaded shafts 30 disposed between the legs of members 28 are fitted through apertures (not shown) in support rails 34 and 35. While V-shaped members have been described, they may be in the form of tubular (hollow) members, in other geometric shapes (e.g., cylindrical), and preferably which are of a size to match or mate against the frames 16–19 and/or the bed 14.

Consider the conveyor belt assembly 10 of the present invention in more detail. It will be seen that bed mounted frames 16, 17, 18 and 19 are fixed to bed 14 with screws 15, such that their flat upper surfaces 20 are substantially flush with the upper surface 40 of elongate bed 14. That is, the flat surfaces 20 of each one individual bed mounted frames 16–19 is co-planar with and provide extensions of the bed's upper surface 40. Each flat surface 20 extends to the rounded portion 21. As best shown in FIG. 5, endless conveyor belt 12 is guided by the surfaces 20 and 21 along its endless path. The belt 12 traverses across surface 40, and flat surfaces 20 and is guided around rounded portion 21 of the bed mounted frames 16, 17, 18 and 19.

Belt 14 is driven by the sprocket 25 which is mounted on and rotated by drive shaft 24. The sprocket teeth engage with complementing ribbed members formed on the underside of plastic conveyor belt 12 see FIG. 5. The second sprocket 39 on an end of drive shaft 24 is connected through the belt or chain 38 connection to electric motor 36. Endless conveyor belt 12 to is thereby driven, with lateral meandering controlled by the rails 29, to track along flat bed 14 and over and around side frames 16, 17, 18 and 19. Rounded portions 20 of side frames 16–19 defines the inside radius of the turns of the plastic conveyor belt at the end of its track.

The plastic conveyor belt 12 is properly and automatically tensioned by the principle known as "catenary sag". The weight of the belt which is left unsupported in the return side of the conveyor results in the catenary sag. Thus, weight of the unsupported belt produces the tension necessary to keep the belt wrapped on the sprocket 25 and in guided relationship with the arc defined by the round surfaces 20 of the frames 16–19. Should any elongation of the belt occur, due to aging, wear, etc., catenary sag will provide automatic adjustment to maintain proper tension.

The alignment of the assembly 10 is facilitated because it is light in weight, and because sufficient tolerance for adjustment, longitudinally along the rails 34 and 35 or up and down (vertically) or tilted, is provided by the space inside the members 28 between the shaft 30 and the inside walls of the members 28. Initial adjustment positions elongate V-shaped members 28 generally against the complementing ramp portion 22 of bed mounted frames 16–19. The belt 38 may be connected between drive shaft sprocket 26 and sprocket 39 on motor shaft 28a. Final alignment is made by shifting the assemblies with respect to the threaded shafts 30 which are fixed in apertures in the rails 29. The belt aligned in x and y (longitudinally along the rails 29) may be (vertically) and may be horizontal or tilted. The assembly 10 is then aligned with the motor shaft. In aligned position, there is sufficient tension in the drive belt 38.

Figure 6:
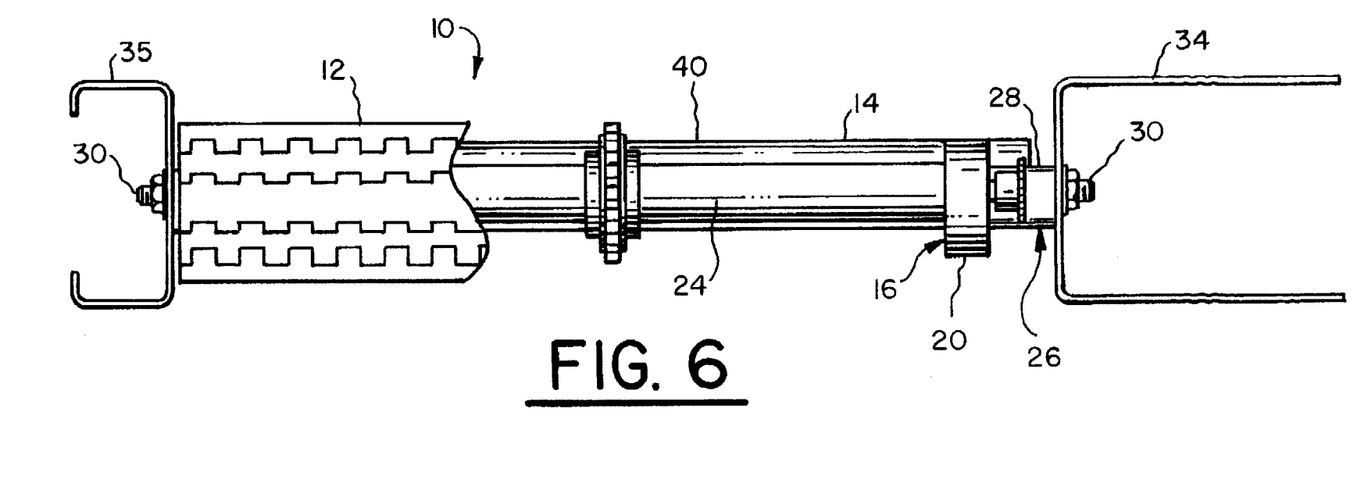
FIG. 6 is a partially broken away front view showing the assembly and side rails also shown in FIG. 2.

The ends of the members 28 are clamped against the rails 34 and 35 by tightening nuts on the threaded ends of the shafts 30 (see FIG. 6).

Figure 7:
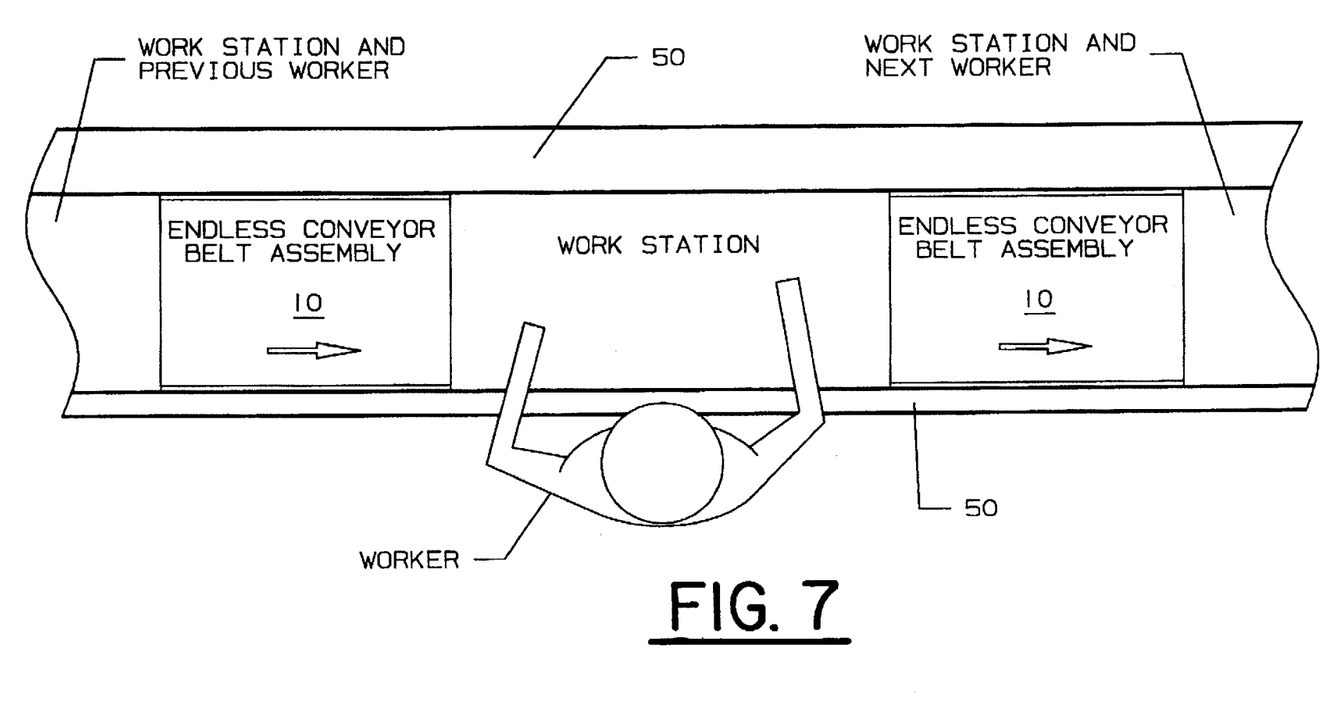
FIG. 7 is a schematic illustration of a work station comprising a plurality of conveyor belt assemblies according to the present invention mounted in motorized side rails.

The self-contained, flat bed conveyor 10 described above results in a conveyor system which is light weight, easily moved and transported to numerous task sites. Accordingly, flat bed conveyor belt assembly 10 may be easily combined with other conveyor systems, or set up as separate work stations which employ moving belts to transfer subassemblies or items requiring consecutive operations by different workers, as schematically illustrated in FIG. 7. Multiple conveyor belt assemblies 10 may be utilized which are, in turn, mounted in to a common pair of extended frame support rails 34 and 35. Further, in some applications it may be desirable to utilize a split flat bed over which a common belt travels. The parts of the split bed may be connected by bed mounted frames.

Other variations and modifications, within the scope of the invention, will undoubtedly suggest themselves to those skilled in this art. The foregoing description therefore should be taken as illustrative and not in a limiting sense.

I claim:

1. An endless conveyor belt assembly, which is mountable between support members comprising:

(a) an endless conveyor belt;

(b) a bed supporting thereon said endless conveyor belt for travel upon and over a top surface of said bed, said bed having opposite ends space from each other in the direction of travel of said belt, said bed also having side edges;

(c) frame members connected to said bed at said opposite ends thereof, said frame members having surfaces co-extensive with said top surface of said bed;

(d) a drive shaft journaled in said frame members which are connected to said bed at one of said ends thereof, said drive shaft having a drive members engageable with said belt and a driven member for receiving driving power for said endless conveyor belt; and (e) mounting means including members disposed under and in supporting relationship with said bed and extending to said side edges thereof enabling adjustment of the position of said assembly with respect to said support members and mounting said assembly between said support members.

2. The assembly as set forth in claim 1 wherein said surfaces of said frame members are guide surfaces for said belt, said guide surfaces including portions generally flush with said surface of said bed.

3. The assembly as set forth in claim 2 wherein said guide surfaces of said frame members include round portions for engaging and guiding said belt around arcs at ends of its endless path of travel, said round portions being adjacent said portions of said guide surfaces which are flush with said surface of said bed.

4. The assembly as set forth in claim 3 wherein four said frame members are provided, each being disposed at a different corner of said bed.

5. An endless conveyor belt assembly which is mountable between support members comprising (a) an endless conveyor belt; (b) a bed supporting thereon said endless conveyor belt for travel over a surface of said bed, said bed having ends spaced from each other in the direction of travel of said belt and sides extending between said ends; (c) frame members connected with said bed at said ends thereof; (d) a drive shaft journaled in said frame members which are disposed at one of said ends of said bed, said drive shaft having a drive member engageable with said belt and a driven member for receiving driving power for said endless conveyor belt; (e) means for mounting said assembly between said support members; (f) said support members presenting rails, and (g) said means for mounting said assembly to said rails comprising a pair of spanner assemblies including means thereon for supporting said bed and engaging said bed mounted frame members with said rails and in aligned relationship with said rails.

6. The assembly as set forth in claim 5 wherein said spanner assemblies each comprise a tubular member defining an inside space, a shaft extending between said rails, said shaft being smaller than said inside space so as to permit movement of said assembly into said aligned relationship, and means engagable with said shaft for clamping said tubular members to said rails to fix said assembly to said rails in said aligned relationship.

7. The assembly as set forth in claim 6 wherein said tubular members are V-shaped in cross-section and are in contact with said bed.

8. The assembly as set forth in claim 6 wherein said bed mounted frame members include means thereon for engaging and positioning said tubular members with respect to said bed.

9. The assembly as set forth in claim 7 wherein said engaging and positioning means on said bed mounted frame members comprise ramped surfaces formed thereon, said ramped surfaces abutting against a mating surface of said tubular members.

10. The assembly as set forth in claim 8 wherein said bed frame members, said bed and said conveyor belt are molded substantially exclusively from plastic.

11. The assembly as set forth in claim 1 wherein said frame members and said bed are one piece unitary structure.

12. The assembly according to claim 1 wherein said surface of said bed is flat.

13. The assembly according to claim 1 said further comprising bearings in said frame members providing the exclusive rotational support for said drive shaft.

14. The assembly according to claim 13 wherein said frame members in which said drive shaft is journaled are spaced laterally with respect to the direction of travel of said belt and each containing a separate bearing exclusively journaling said drive shaft.

15. The assembly according to claim 1 wherein said mounting means include as part of said assembly mounting members which are attachable over a range of displacement of said assembly in X and Y coordinates to said support members, X being in the direction of travel of said belt and Y being in a direction perpendicular to said surface of said bed.

16. A self-contained endless conveyor belt assembly comprising:

(a) a generally flat bed having ends and sides;

(b) an endless conveyor belt;

(c) frame members mounted along the sides of said bed at the ends thereof and defining arcuate and surfaces on which said conveyor belt is guided as it travels over said bed;

(d) a drive shaft coupled between a pair of said frame members which are disposed at one of the ends of said bed, said drive shaft being journaled in said pair of frame members, a drive member on said drive shaft for engaging in driving the endless conveyor belt;

(e) said bed, frame members, drive shaft and belt forming a conveyor belt assembly;

(f) support rails disposed along said sides of said bed covering said assembly along the sides thereof;

means in supporting relationship with said frame members and said bed for mounting said frame members and said bed between said support rails, said mounting means including means enabling adjustment of the position of said assembly with respect to said rails; and (h) a motor mounted on at least one of said support rails being disposed along a covered side of said assembly and being coupled to said drive shaft for rotating said drive shaft thereby causing said endless belt to track along said bed and over and around said frame members.

17. The system according to claim 16 wherein said adjusting means comprising a tubular member extending between the sides of said bed, and means clamping said tubular members to locate said assembly in adjusting portion on said rails, said clamping means including shafts extending through said tubular member and said rails screw attachments on said shafts.

18. The system according to claim 16 wherein said drive member is a sprocket, and a belt drive mechanism including sprockets with belt therebetween coupling said motor and said drive shaft.

19. A conveyor system which comprises a pair of side rails and a plurality of assemblies disposed between said rails and spaced from each other along said rails, each of said assemblies comprises an endless conveyor belt, a bed supporting thereon said endless conveyor belt for travel upon and over a surface of said bed, said bed having ends spaced from each other in the direction of travel of said belt and sides between said ends, frame members connected with said bed at said ends thereof, said frame members having surfaces co-extensive with the surface of said bed upon which said belt travels, a drive shaft journaled in said frame members at one of said ends of said bed, said drive shaft having a drive member engageable with said belt and a driven member for receiving driving power for said endless conveyor belt, and mounting means including members disposed under and in supporting relationship with said bed and extending to the sides of said bed into contact with said rails, and means enabling adjustment of the position of said assembly with respect to said rails, and means coupled to said drive shaft of each of said plurality of assemblies and mounted in said rails for motorizing said plurality of assemblies.

* * * * *